United States Patent Office 3,442,727
Patented May 6, 1969

3,442,727
EMULSIFIED NITRIC ACID BLASTING COMPOSITION AND METHOD OF PREPARING SAME
James R. Thornton, Tamaqua, Pa., assignor to Atlas Chemical Industries, Inc., Wilmington, Del., a corporation of Delaware
No Drawing. Filed Aug. 3, 1967, Ser. No. 658,021
Int. Cl. C06b 1/04
U.S. Cl. 149—46                           15 Claims

ABSTRACT OF THE DISCLOSURE

An emulsified nitric acid blasting composition is prepared with an aqueous nitric acid solution forming a water phase of the emulsion, a carbonaceous fuel forming an oil phase of the emulsion, and said phases emulsified by mono-or di-esters of phosphoric acid or salts thereof. The new blasting composition is found to have improved stability and explosive performance characteristics.

---

This invention relates to an emulsified nitric acid containing blasting composition prepared by a method wherein mono- or di-esters of phosphoric acid or salts thereof are included as the emulsifier to improve stability in storage and to insure greater reliability of the product in use.

Nitric acid sensitized blasting compositions are known and may include principal components such as an aqueous solution of nitric acid, an inorganic nitrate, a carbonaceous fuel, a water-in-oil type surfactant, and an acid-resistant gelation stabilizer. Compounds such as methyl vinyl ether-maleic anhydride copolymers are typical examples of acid-resistant gelation stabilizers which have been used in nitric acid sensitized blasting compositions to prevent component separation during extended periods of storage. Otherwise, the nitric acid component of such blasting compositions eventually hydrolyzes materials employed to form the emulsion resulting in emulsion component separation.

It has now been found that by including mono- or di-esters of phosphoric acid or salts thereof as the emulsifier in a nitric acid containing blasting composition, by the practice of the present invention, there results an emulsion blasting composition of improved stability in storage and greater reliability in use without need for the further addition of an acid-resistant gelation stabilizer considered essential heretofore for long term stability.

The emulsion blasting composition of the present invention broadly includes an acid-water phase, an oil phase, and a phosphate emulsifier as defined herein. The emulsion blasting composition may include as principal components, materials such as an aqueous solution of nitric acid, an inorganic oxidizer salt, and a carbonaceous fuel. In addition, mono- or di-esters of phosphoric acid or salts thereof are included which effectively aid in producing and retaining the emulsion characteristics of the prepared blasting composition during periods of storage.

Generally stated, the present invention provides a method for preparing a new stable nitric acid emulsion blasting composition emulsified with mono- or diesters of phosphorc acid or salts thereof. These phosphate emulsifiers found useful for emulsifying the present acid emulsion and for retaining the emulsion characteristics during periods of storage may be defined by the acid formula:

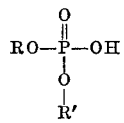

where R is selected from the group consisting of hydrogen and an alkyl radical, and where R' is an alkyl radical. Generally, the alkyl radicals of the above formula may contain from about 12 to about 30 carbon atoms and preferably from about 12 to about 18 carbon atoms. These carbon atoms may be formed as a straight chain, a branched chain, or a cyclic grouping. Further groups may be substituted such as inert radicals typically present in water-in-oil type emulsifying agents. Combinations of these various acid phosphate materials are also useful as are the salts thereof.

Representative examples of phosphate emulsifying materials found useful herein include lauryl acid phosphate, tetradecyl acid phosphate, monoethanolamine tetradecyl acid phosphate, ethylenediamine tetradecyl acid phosphate, cetyl acid phosphate, the sodium salt of lauryl acid phosphate, oleyl acid phosphate, stearyl acid phosphate, the sodium salt of stearyl acid phosphate, di-tetradecyl acid phosphate and the like. Mixtures of these various materials may be also usefully employed.

The amount of the mono- or di-esters of phosphoric acid or salts thereof employed to emulsify the present blasting composition may vary from about 0.25 part to about 20 parts by weight as based upon 100 parts by weight of aqueous nitric acid solution. Desirably, from about 0.5 part to about 7.5 parts by weight of such a phosphate emulsifier is sufficient. However, additional amounts of phosphate emulsifier may be added since the surplus may serve as a supplemental fuel for the mixture.

The aqueous acid phase of the present emulsion is formed of a nitric acid component broadly taken as about 100 parts by weight of an aqueous nitric acid solution containing at least from about 0.06%, that is, about from an emulsion pH of 2, to about 95% by weight of nitric acid. Aqueous nitric acid solutions having a nitric acid concentration greater than about 20% are usually preferred and generally produce a final composition having a satisfactory detonation velocity and sensitivity. Aqueous nitric acid solution of about 60% by weight of nitric acid is particularly suited for use in the present composition since such a solution is readily available in the commercial market.

The oil phase of the present emulsion composition is formed of a carbonaceous fuel material which is immiscible, i.e., unable to form a stable homogeneous mixture with an aqueous nitric acid component, and substantially unreactive with an aqueous solution of nitric acid containing between about 20% and about 80% by weight of nitric acid. The oil phase thus is capable of forming a continuous or external emulsion phase with the present emulsifier.

Generally, the present composition contains about 6 to about 150 parts by weight of immiscible, carbonaceous fuel as based on 100 parts by weight of aqueous nitric acid solution.

The carbonaceous fuel material selected for use as the oil phase in the present emulsion system will generally depend upon the physcal form desired in the final product. The firmness of the emulsion system may be varied depending on the nature of the carbonaceous fuel material used and especially upon the physical consistency of the fuel. The carbonaceous fuel material selected is also found to influence the explosive characteristics of the prepared product since occluded gas which influences such characteristics is primarily retained in the preferred fuel component as a discontinuous phase of the emulsion system.

The carbonaceous fuel material may include either an all oil or wax component, a wax and oil component, or a wax and an oil-soluble non-acid reactive polymeric material component. Paraffinic hydrocarbons are generally suited for use in the carbonaceous fuel component. Other materials such as saturated fatty acids may be also used as supplemental fuels, if desired.

The oil component used herein may be of any desired viscosity and is generally characterized as an acid resistant petroleum oil. A Brookfield viscosity at 85° F. for a typical petroleum oil is about 160 centipoises.

Waxes which may be used in the carbonaceous fuel component include waxes derived from petroleum such as petrolatum wax, microcrystalline wax, and paraffin wax. In the preferred embodiment, the most desirable waxes are those which have melting points of at least 80° F. and which are readily compatible with the formed emulsion. Preferably, these waxes have a melting point in the range of about 100° F. to about 160° F.

An oil-soluble, non-acid reactive polymeric material such as polyethylene may be included in the carbonaceous fuel component of the present emulsion to modify and improve the fuel component in retaining occluded air in the emulsion over a prolonged period of time. Other oil-soluble, non-acid reactive polymeric materials may also be employed for this purpose as desired.

Supplementary fuels of the saturated fatty acid type which are suitable for use in the carbonaceous fuel component include octanoic acid, decanoic acid, lauric acid, palmitic acid, behenic acid and stearic acid.

In the preferred embodiment of the present invention, the carbonaceous fuel forming the oil phase is characterized with a gas occlusion temperature between about 0° F. and about 190° F., and preferably with a gas occlusion temperature between about 95° F. and about 130° F.

The gas occlusion temperature may be defined as a temperature at which the emulsion system, when substantially free of occluded gas at a temperature above about 70° F., will demonstrate the ability to occlude gas when cooled and agitated. The gas occlusion temperature may also be defined as that temperature below which gas or atmospheric air will become entrapped within the emulsion system as evidenced by a sudden decrease in the density of the emulsion-occluded gas system. Conversely, the gas occlusion temperature is that temperature at which an aerated emulsion of low density, upon heating to a temperature above about 70° F., will lose occluded gas to the atmosphere when the emulsion-occluded gas system is agitated in some manner to expose new surfaces of the emulsion to the atmosphere. Deaeration as described is accompanied by a sudden increase in the density of the emulsion-occluded gas system.

The consistency of the preferred carbonaceous fuel component for the external emulsion phase is important for retention of occluded gas which is desirable to provide a higher degree of sensitivity in the product emulsion. If the consistency at ambient use and storage conditions is too low, the occluded gas will tend to agglomerate or will be expelled from the emulsion. On the other hand, the carbonaceous fuel component must be sufficiently fluid at manufacturing temperatures to permit formation of the emulsion. Thus, although the preferred finally prepared emulsion may have a solid or near solid external phase, it appears usually necessary that the external emulsion phase be liquid or sufficiently fluid when the emulsion is prepared in the first instance. This preferred carbonaceous fuel component should therefore have the ability to provide this desired consistency differential with variations in temperature.

It is generally found that when the gas occlusion temperature is lowered to below about 70° F., the prepared emulsion will either experience a tendency to lose occluded gas in normal storage and use, or the occluded gas will tend to agglomerate resulting in a product having decreased blasting potential. It is recognized, however, that such emulsions may be prepared with occluded gas provided that the storage and use temperatures are maintained very low, i.e., substantially below about 70° F.

It is also generally found that gas occlusion temperatures below about 190° F. are most useful for preparing the present emulsion as it is generally desirable from a convenience stand-point to work with nitric acid emulsions at temperatures below the boiling point thereof. The preferred gas occlusion temperature in the range of about 95° F. to about 130° F., therefore avoids both gas agglomeration in normal storage and use and is most practical for commercially preparing the present emulsion in the preferred form.

With the addition of any given amount of wax in the preferred carbonaceous fuel component, the thickening effect produced may be that of the wax plus a wax modifier such as a viscous oil or oil-soluble, non-acid reactive polymeric material. It is found that a quantity of at least about 2% and preferably at least about 5% by weight of the preferred carbonaceous fuel component should desirably constitute wax or insufficient occlusion of gas may result in the finally prepared emulsion.

Many variations exist for introducing occluded gas into the preferred emulsion system. The most common method consists of simply mixing a fluid emulsion at a temperature either at or above the gas occlusion temperature, in an open vessel while cooling the emulsion to a temperature below that required for gas occlusion. Gas may also be introduced by bubbling gas through an orifice, by the use of gas injectors, or by various other mechanical means. Chemical generation of gas in the emulsion is also possible. It is also noted that although the occluded gas is generally air, other emulsion compatible gases may also be used if desired.

Sufficient gas may be introduced into the present preferred emulsion composition by means of a gas inducing mixer or by direct introduction of gas into the emulsion which is then subsequently blended. An example of a gas inducing mixer is a ribbon-type mixer whereas the Votator scraped surface heat exchanger type unit by Girdler Company, Louisville, Kentucky, exemplifies suitable means for combining directly introduced gas with the emulsion. The gas may be added such that the prepared composition has from about 4% by volume to about 47% by volume at 70° F. and atmospheric pressure of occluded gas in the finally prepared emulsion and preferably from about 13% to about 33% by volume thereof.

Since one of the preferred embodiments of the present invention requires that the components be proportioned within rather specific ranges, the preferred composition being processed may be heated to drive off entrapped gas. By having an entrapped gas-free system during the preblending or blending stages a standard composition results into which the exact amount of gas to be added may be predetermined to control the density of the prepared composition. The density is generally about 0.50 gm./cc. to about 1.50 gms./cc. at about 70° F. and preferably from about 1.05 gms./cc. to about 1.30 gms./cc.

The emulsion of the present invention may contain an amount up to about 800 parts by weight of an inorganic oxidizer salt such as ammonium nitrate, alkali metal nitrates, or mixtures thereof as based on 100 parts by weight of aqueous nitric acid solution. While commercially available "fertilizer grade" ammonium nitrate is suited for use as the inorganic oxidizer salt of the present invention, sodium nitrate and potassium nitrate may also be used. Various other conventional inorganic oxidizer salts may also be used, if desired. Preferably, the inorganic oxidizer salt component is in particulate form, that is, in the form of prills, pellets or granules having a size that will pass a No. 8 U.S.S. screen.

The sensitivity and detonation velocity of the emulsion of the present invention may be varied by addition of an inert, non-explosive propagation sustaining material, for example, expanded particulate perlite, or hollow glass balls. Generally about 1 part by weight of propagation sustaining material, based on 100 parts by weight of about a 60% nitric acid solution, is required to obtain an advantage and usually more than about 70 parts by weight of propagation sustaining material fails to yield further improvement. Suitable propagation sustaining material has a particle size that will pass through a No. 8 U.S.S. screen.

The process of the present invention generally involves forming an emulsion blasting composition by mixing an aqueous nitric acid solution, an inorganic oxidizer salt, a carbonaceous fuel immiscible with the nitric acid solution, and mono- or di-esters of phosphoric acid or salts thereof. This basic process is generally performed using very rapid mixing of all the ingredients within controlled ranges determined for each mixing unit.

The process of the present invention may also be performed by initially forming a pre-blend of an aqueous nitric acid solution and an inorganic nitrate and a pre-blend of a carbonaceous fuel immiscible with the nitric acid solution and the phosphate emulsifier of the present invention. Thereafter, these two pre-blends, having substantially uniform consistency, are combined by mixing to form a substantially uniform final composition. By preparing two pre-blends in this fashion, the ingredients may be more conveniently handled in storage or shipment than in the process wherein the ingredients are all simply blended together. The present blasting composition may be prepared in a processing plant and transported to the blasting site. Alternately, the present composition may be prepared at the blasting site in a mobile unit.

In the step of bringing together the pre-blends in the present method, it has been discovered that greater uniformity of product may be obtained if the temperature during the mixing cycles is kept within the range from about 100° F. to about 150° F. However, the process of this invention may be performed outside these temperature limits if desired.

In order to further illustrate the present invention, the following examples are given wherein all parts are by weight unless otherwise indicated:

EXAMPLE 1

An emulsion blasting composition is prepared by mixing the following ingredients:

| Ingredient: | Parts by weight |
| --- | --- |
| Ammonium nitrate | 100 |
| Aqueous nitric acid solution (60%) | 100 |
| Paraffin | 8.9 |
| Tetradecyl acid phosphate | 2.2 |
| Mineral oil | 11.1 |

The above ingredients are combined at a temperature of about 115° F., agitated and cooled to 105° F. The prepared emulsion is found to have a density of about 1.08 gms./cc. at 70° F. After about 28 days storage, the emulsion is found to have a density of 1.10 gms./cc. at 70° F. and a 3″ x 12″ cartridge detonation velocity of about 17,220 ft./sec. when detonated by a 3″ x 3″ cartridge of high velocity gelatin dynamite initiated by a No. 6 standrad electric blasting cap.

EXAMPLE 2

A series of emulsion blasting compositions are prepared by the procedure of Example 1, each having substituted for tetradecyl acid phosphate, one of the following phosphate emulsifying materials: lauryl acid phosphate, monoethanolamine tetradecyl acid phosphate, ethylenediamine tetradecyl acid phosphate, the sodium salt of stearyl acid phosphate, oleyl acid phosphate, stearyl acid phosphate, and the sodium salt of lauryl acid phosphate. The prepared emulsions are found to have densities between 1.15 and 1.20 gms./cc. at 70° F. After storage for 28 days, the emulsions are found to have densities between 1.20 and 1.28 gms./cc. When detonated with a 3″ x 3″ cartridge of high velocity gelatin dynamite, the 3″ x 12″ cartridge velocities are found to be within the range of about 15,000 to about 18,500 ft./sec.

EXAMPLE 3

An emulsion blasting composition is prepared by mixing the following ingredients:

| Ingredients: | Parts by weight |
| --- | --- |
| Aqueous nitric acid solution (60%) | 100 |
| Ammonium nitrate | 139 |
| Sodium nitrate | 20 |
| Atreol 34 [1] | 11.4 |
| Indrawax 2119 [2] | 12.9 |
| Microballoons [3] | 5.7 |
| Alkapent BD–10 [4] | 2.9 |

[1] The trademark for a highly refined mineral oil supplied by Atlantic Refining Company.
[2] The trademark for a highly cohesive microcrystalline wax having a melting point of about 114–119° F. and supplied by Industrial Raw Materials Corporation.
[3] The trademark for hollow, finely divided, low-density particles of glass supplied by the Standard Oil Company of Ohio.
[4] The trademark for mono- and di-linearalkyl phosphates having a carbon chain length averaging $C_{18}$ and supplied by Wayland Chemical Company.

The above ingredients are combined in a water jacketed mixer. Heat is applied to the mixer until the temperature of emulsion formation is passed. Thereafter, the ingredients are actively mixed to form an emulsion of substantially uniform consistency. The prepared emulsion is slowly cooled to a gas occlusion temperature of 105° F. The temperature is continuously lowered to about 100° F. at which point mixing is stopped. The finally prepared emulsion upon further cooling is found to have a density of about 1.21 gms./cc. at 70° F., and about 12% by volume of occluded air at 70° F. and atmospheric pressure. When detonated after 28 days with a 3″ x 3″ cartridge of high velocity gelatin dynamite, a 3″ x 12″ cartridge of the emulsion is found to have a detonation velocity of 16,800 ft./sec.

EXAMPLE 4

An emulsion blasting composition is prepared by combining the following ingredients:

| Ingredients: | Parts by weight |
| --- | --- |
| Aqueous nitric acid solution (60%) | 100 |
| Ammonium nitrite | 100 |
| Atreol 34 [1] | 20 |
| Indrawax 2119 [2] | 22.5 |
| Stearyl acid phosphate | 5 |
| Sodium nitrate | 50 |

[1] The trademark for a highly refined mineral oil supplied by Atlantic Refining Company.
[2] The trademark for a highly cohesive microcrystalline wax having a melting point of about 114–119° F. and supplied by Industrial Raw Materials Corporation.

The above ingredients are combined according to the procedure of Example 3. The prepared emulsion is found to occlude air at about 100° F. Mixing is terminated at 95° F. The prepared emulsion is found to have a density of about 1.18 gms./cc. at 70° F. with an occluded air content of about 15% by volume at 70° F. and atmospheric pressure. When detonated with a 3″ x 3″ cartridge of high velocity gelatin dynamite after 28 days, the emulsion in a 3″ x 12″ cartridge is found to have a velocity of 13,300 ft./sec.

EXAMPLE 5

An emulsion blasting composition is prepared by first mixing the following ingredients as pre-blends:

Pre-blend A

| Ingredient: | Parts by weight |
| --- | --- |
| Aqueous nitric acid solution (60%) | 100 |
| Ammonium nitrate | 302.5 |
| Sodium nitrate | 50 |

Pre-blend B

| Ingredient: | Parts by weight |
|---|---|
| Atreol 34 [1] | 20 |
| Indrawax 2119 [2] | 22.5 |
| Lauryl acid phosphate | 5 |

[1] The trademark for a highly refined mineral oil supplied by Atlantic Refining Company.
[2] The trademark for a highly cohesive microcrystalline wax having a melting point of about 114–119° F. and supplied by Industrial Raw Materials Corporation.

Pre-blends A and B are prepared as substantially uniform blends. Thereafter, Pre-blend B is added with mixing to Pre-blend A. Sufficient air is introduced into the blend during mixing by the procedure of Example 3 such that the prepared emulsion has a density of about 1.00 gm./cc. at 70° F. with an occluded air content of 28% by volume at 70° F. and atmospheric pressure. The emulsion, after 28 days in a 3″ x 12″ cartridge showed a detonation velocity of 13,000 ft./sec. when detonated by a 3″ x 3″ cartridge of high velocity gelatin dynamite.

The composition of the present invention may include other ingredients to modify the physical properties of the mixture. For example, barium sulfate or related materials may be employed to increase the density of the prepared emulsion.

The compositions of the present invention have the advantage of performing as powerful explosives but do not contain, in the preferred embodiments, a sensitive high explosive component. Such compositions are highly insensitive to usual mechanical shock but are sensitive to detonation when initiated by conventional primers generally used in the art.

It is understood that the foregoing detailed description is given merely by way of illustration and that many variations may be made therein without departing from this invention.

What is claimed is:

1. A blasting composition which comprises, an emulsion formed of:
   (A) a nitric acid solution;
   (B) an inorganic nitrate;
   (C) a carbonaceous fuel immiscible with said nitric acid solution forming an oil phase of said emulsion; and
   (D) an emulsifier which is a compound having the formula:

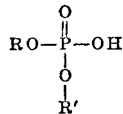

where R is selected from the group consisting of hydrogen and an alkyl radical, and where R' is an alkyl radical; or a salt of such compound.

2. The blasting composition of claim 1 wherein the alkyl radical defined by R or R' contains from about 12 to about 30 carbon atoms.

3. The blasting composition of claim 1 wherein the alkyl radical defined by R or R' contains from about 12 to about 18 carbon atoms.

4. The blasting composition of claim 1 wherein the emulsifier is a blend of mono- and di-esters of phosphoric acid wherein the average R and R' carbon chain length is 13.

5. The blasting composition of claim 1 wherein the emulsifier is selected from the group consisting of tetradecyl acid phosphate and di-tetradecyl acid phosphate.

6. The blasting composition of claim 1 wherein the nitric acid solution contains at least from aout 0.06% to about 95% by weight of nitric acid.

7. The blasting composition of claim 6 wherein the nitric acid solution contains from about 20% to about 80% by weight of nitric acid.

8. The blasting composition of claim 1 wherein the inorganic nitrate is ammonium nitrate.

9. The blasting composition of claim 1 wherein:
   (A) the nitric acid solution is present in an amount of 100 parts by weight;
   (B) the inorganic nitrate is in an amount up to about 800 parts by weight;
   (C) the carbonaceous fuel is present in an amount of above 6 to about 150 parts by weight; and
   (D) the emulsifier is present in an amount of about 0.25 to about 20 parts by weight.

10. The blasting composition of claim 9 wherein about 1 to about 70 parts by weight of a non-explosive propagation sustaining material is included.

11. The blasting composition of claim 9 wherein the carbonaceous fuel contains at least 2% by weight of a wax having a melting point of at least 80° F.

12. The blasting composition of claim 11 wherein the carbonaceous fuel has a gas occlusion temperature in the range from about 70° F. to about 190° F.

13. The blasting composition of claim 12 wherein the gas occlusion temperature is in the range from about 95° F. to about 130° F.

14. The blasting composition of claim 11 wherein the formed emulsion contains from about 4% to about 47% by volume of occluded gas at 70° F. and atmospheric pressure.

15. The blasting composition of claim 11 wherein the formed emulsion contains from about 13% to about 33% by volume of occluded gas at 70° F. and atmospheric pressure.

References Cited

UNITED STATES PATENTS

| 3,161,551 | 12/1964 | Egly et al. | 149—46 |
| 3,164,503 | 1/1965 | Gehrig | 149—74 X |
| 3,242,019 | 3/1966 | Gehrig | 149—60 X |
| 3,282,754 | 11/1966 | Gehrig | 149—74 |
| 3,296,044 | 1/1967 | Gehrig | 149—74 |
| 3,361,601 | 1/1968 | Chrisp | 149—74 X |
| 3,376,176 | 4/1968 | Gehrig | 149—74 X |

CARL D. QUARFORTH, Primary Examiner.

S. J. LECHERT, Assistant Examiner.

U.S. Cl. X.R.

149—45, 74